(12) United States Patent
Mather et al.

(10) Patent No.: US 8,301,024 B2
(45) Date of Patent: Oct. 30, 2012

(54) CAMERA FLASH, A CAMERA, AND A METHOD OF GENERATING A FLASH

(75) Inventors: Jonathan Mather, Oxford (GB); Andrew Kay, Oxford (GB); David James Montgomery, Oxford (GB); James Rowland Suckling, Oxford (GB); Emma Jayne Walton, Oxford (GB); Yasunori Kanazawa, Osaka (JP); Yukio Watanabe, Osaka (JP); Hirofumi Oda, Osaka (JP); Taro Sugita, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/952,306

(22) Filed: Nov. 23, 2010

(65) Prior Publication Data
US 2011/0123184 A1 May 26, 2011

(30) Foreign Application Priority Data
Nov. 26, 2009 (GB) .................................. 0920734.1

(51) Int. Cl.
*G03B 15/03* (2006.01)
(52) U.S. Cl. ........................................................ 396/176
(58) Field of Classification Search .................... 396/176
See application file for complete search history.

(56) References Cited

U.S. PATENT DOCUMENTS

| | | | |
|---|---|---|---|
| 6,430,371 B1 | 8/2002 | Cho | |
| 7,088,333 B1 | 8/2006 | Manabe et al. | |
| 7,136,672 B2 | 11/2006 | Kitano et al. | |
| 2001/0001207 A1* | 5/2001 | Shimizu et al. | 257/98 |
| 2002/0025157 A1 | 2/2002 | Kawakami | |
| 2003/0216151 A1 | 11/2003 | Kitano et al. | |
| 2004/0183774 A1 | 9/2004 | Manabe et al. | |
| 2004/0184286 A1* | 9/2004 | De Lamberterie | 362/559 |
| 2004/0188639 A1 | 9/2004 | Masuda et al. | |
| 2005/0063195 A1 | 3/2005 | Kawakami | |
| 2006/0120111 A1 | 6/2006 | Onishi | |

(Continued)

FOREIGN PATENT DOCUMENTS
CN 1461165 A 12/2003
(Continued)

OTHER PUBLICATIONS

British Search Report for corresponding Application No. GB0920734.1 dated May 24, 2010.
(Continued)

*Primary Examiner* — Rodney Fuller
(74) *Attorney, Agent, or Firm* — Renner, Otto, Boisselle & Sklar, LLP

(57) ABSTRACT

A camera flash comprises a light guide arranged to extract light at least through one surface; and one or more light sources arranged, in use, to emit light into the lightguide. Each light source is an LED or a laser diode. The camera flash is connectable, in use, to drive circuitry, the drive circuitry being for driving the light source(s) to emit a pulse of light. The waveguide spreads out the light from the light source(s), so that a flash of light from the camera flash does not present a safety risk, while minimizing loss of the light from the light source(s). The camera flash can thus provide a high overall optical output, spread over an extended area (as defined by the waveguide). The lightguide may for example be disposed around a camera module of a mobile telephone camera.

22 Claims, 18 Drawing Sheets

U.S. PATENT DOCUMENTS

| | | | |
|---|---|---|---|
| 2006/0152943 A1* | 7/2006 | Ko et al. | 362/627 |
| 2006/0209524 A1* | 9/2006 | Tenmyo | 362/16 |
| 2006/0209561 A1 | 9/2006 | Tenmyo | |
| 2006/0227546 A1* | 10/2006 | Yeo et al. | 362/227 |
| 2006/0250519 A1 | 11/2006 | Kawakami | |
| 2007/0030340 A1 | 2/2007 | Kitano et al. | |
| 2007/0035424 A1 | 2/2007 | Janssen et al. | |
| 2008/0062302 A1 | 3/2008 | Kawakami | |
| 2008/0074551 A1 | 3/2008 | Kawakami | |
| 2008/0136960 A1 | 6/2008 | Kawakami | |
| 2008/0266863 A1* | 10/2008 | Rinko | 362/278 |
| 2008/0266904 A1* | 10/2008 | Ko et al. | 362/619 |
| 2008/0308824 A1 | 12/2008 | Shchekin et al. | |
| 2009/0086502 A1* | 4/2009 | Chang | 362/559 |
| 2009/0116241 A1 | 5/2009 | Ashoff et al. | |
| 2009/0160758 A1 | 6/2009 | Manabe et al. | |
| 2009/0273732 A1 | 11/2009 | Shimura et al. | |
| 2010/0103347 A1* | 4/2010 | Mizuuchi et al. | 349/64 |
| 2010/0142223 A1 | 6/2010 | Suckling et al. | |
| 2010/0226145 A1* | 9/2010 | Yu | 362/561 |
| 2011/0090422 A1 | 4/2011 | Hamada | |
| 2011/0128471 A1* | 6/2011 | Suckling et al. | 349/62 |

FOREIGN PATENT DOCUMENTS

| | | |
|---|---|---|
| CN | 1782819 A | 6/2006 |
| CN | 1834769 A | 9/2006 |
| JP | 2000-331523 A | 11/2000 |
| JP | 2005-148092 A | 6/2005 |
| JP | 2007-226250 A | 9/2007 |
| JP | 2008-286935 A | 11/2008 |
| JP | 2009-272096 A | 11/2009 |
| KR | 10-2005-0122260 | 12/2005 |
| WO | 2008/078136 A1 | 7/2008 |
| WO | 2008/152610 A2 | 12/2008 |
| WO | 2009/118942 A1 | 10/2009 |

OTHER PUBLICATIONS

Okumura et al., "Highly-efficient backlight for liquid crystal display having no optical films", Applied Physics Letters, vol. 83, No. 13, Sep. 29, 2003, p. 2515.

Partial European Search Report for corresponding European Application No. 10192104.7 dated Jun. 7, 2011 (previously listed on the IDS submitted on Aug. 8, 2011).

* cited by examiner

FIG. 4
a). Cross section
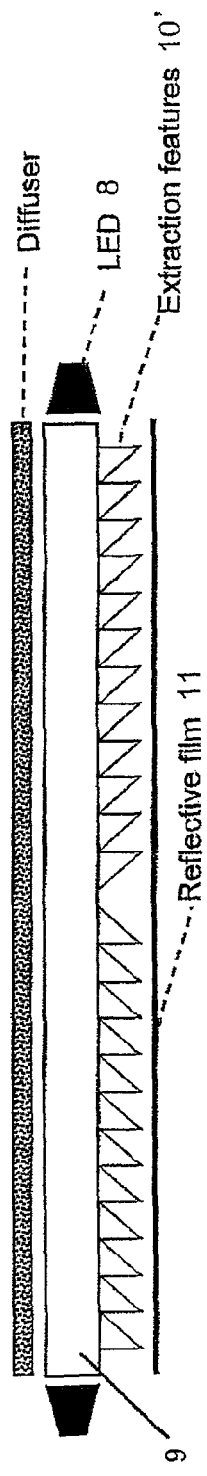
b). Top view
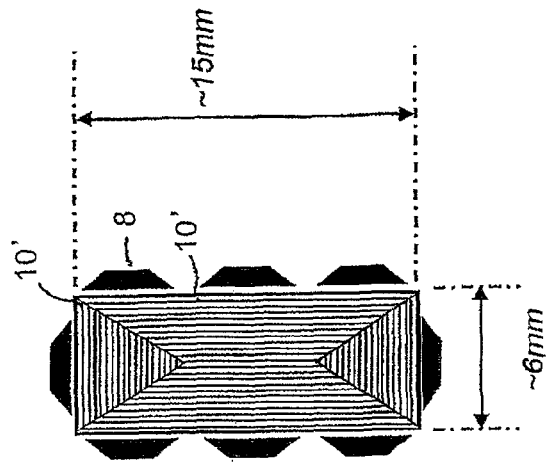
c). Top view
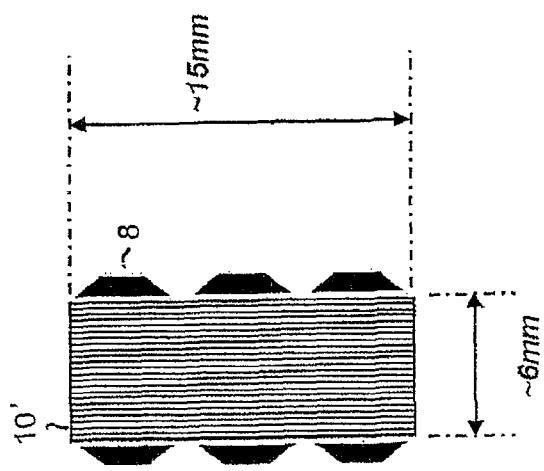

FIG. 5
a). Cross section
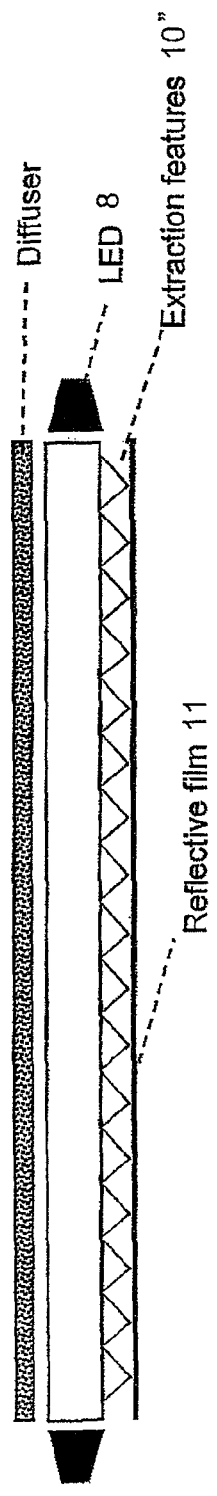
b). Top view
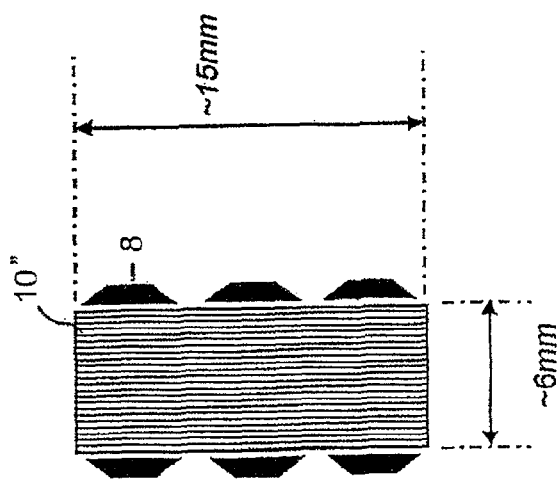

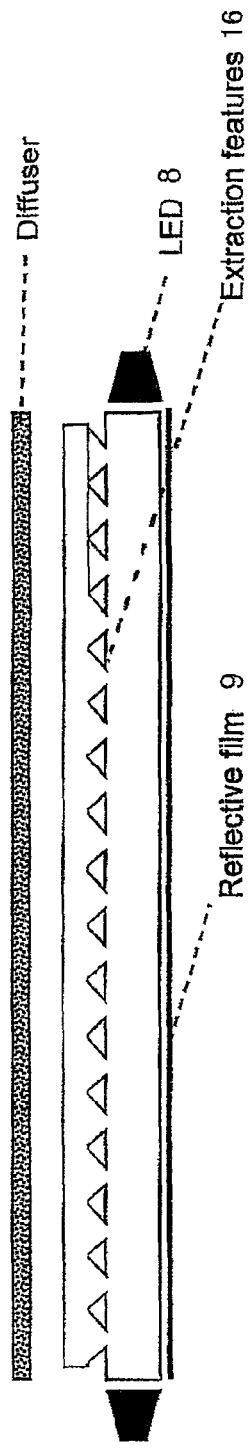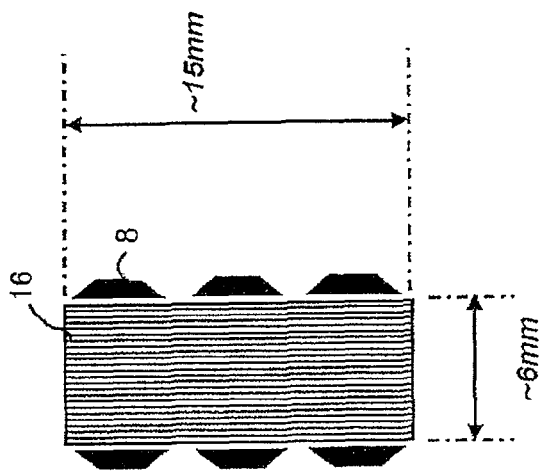
FIG. 6
a). Cross section
b). Top view

FIG. 7
a). 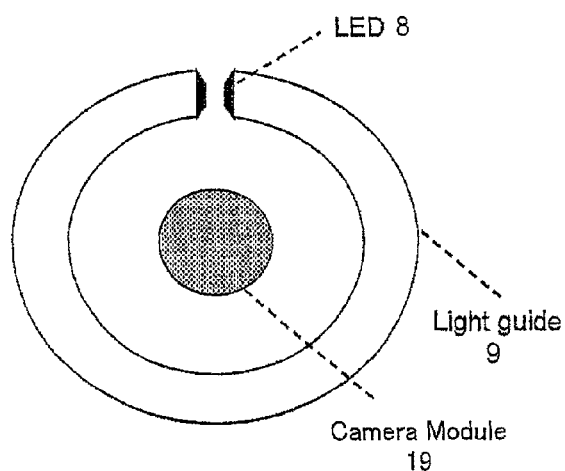
b). 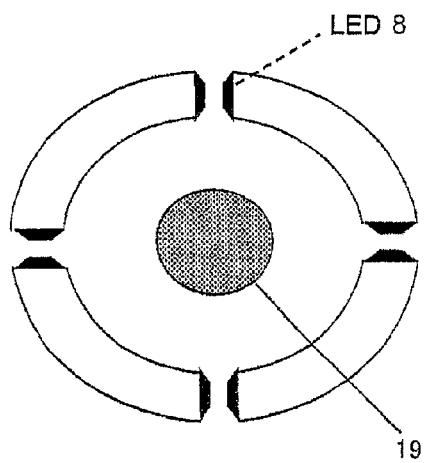
c). 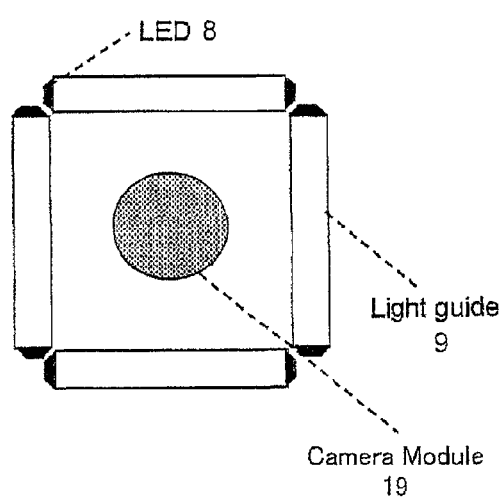
d). 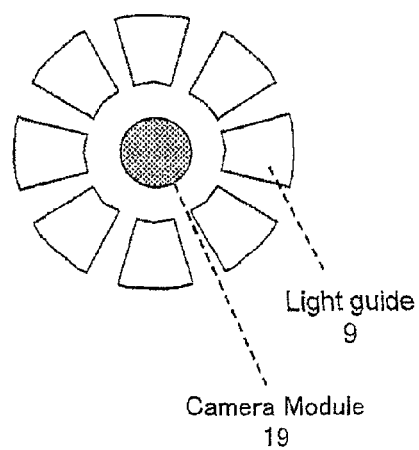

F I G. 8
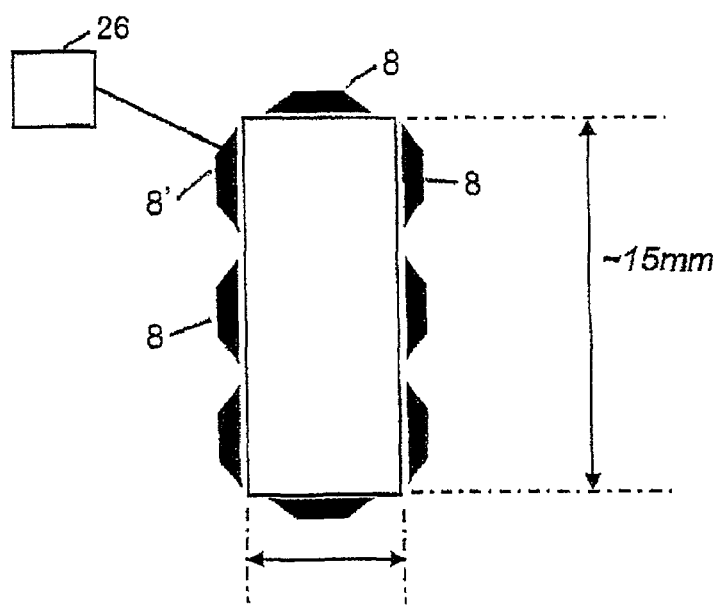

FIG. 9
a). Top view
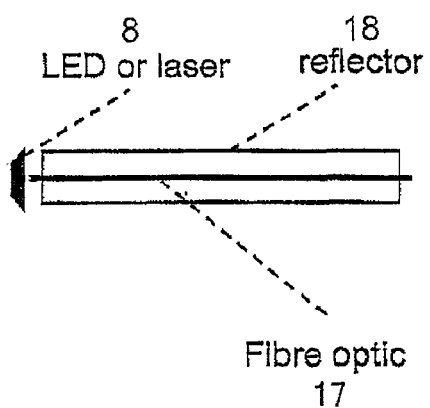
b).
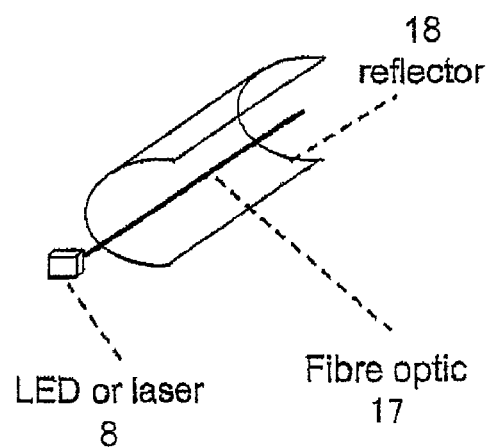

FIG. 10
a). Cross section
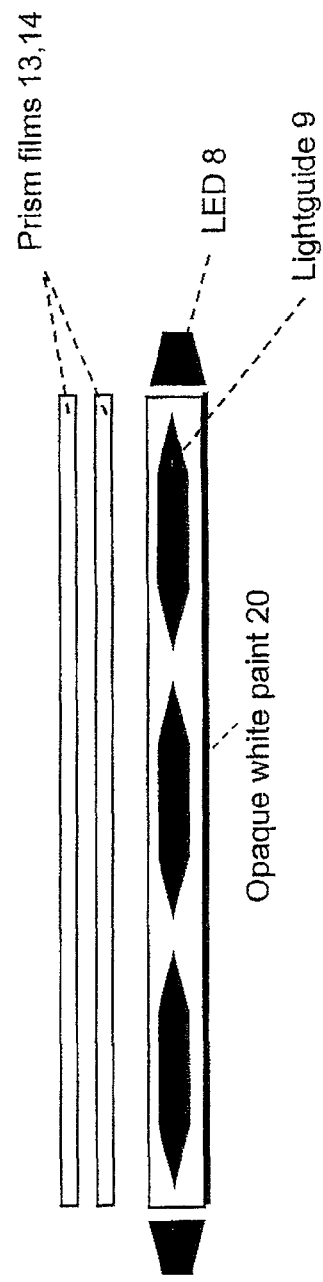
b). Top view
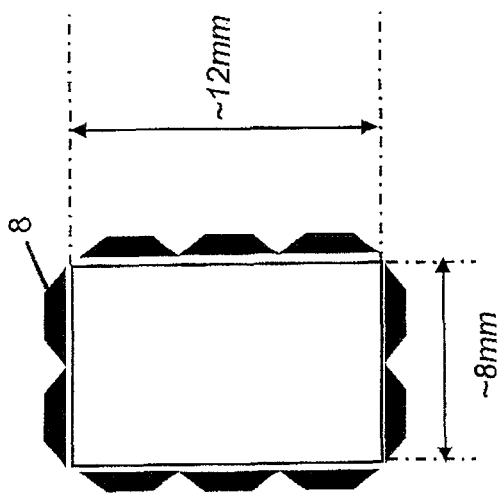

a). Cross section
b). Top view a). Cross section
b). Top view

FIG. 13
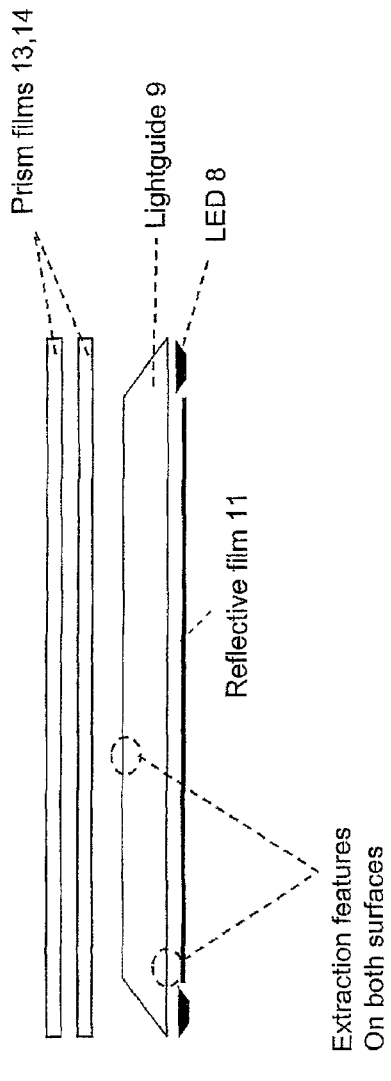
a). Cross section
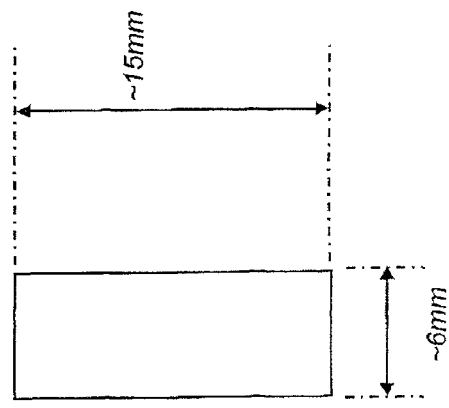
b). Top view

F I G. 1 4
a). Cross section
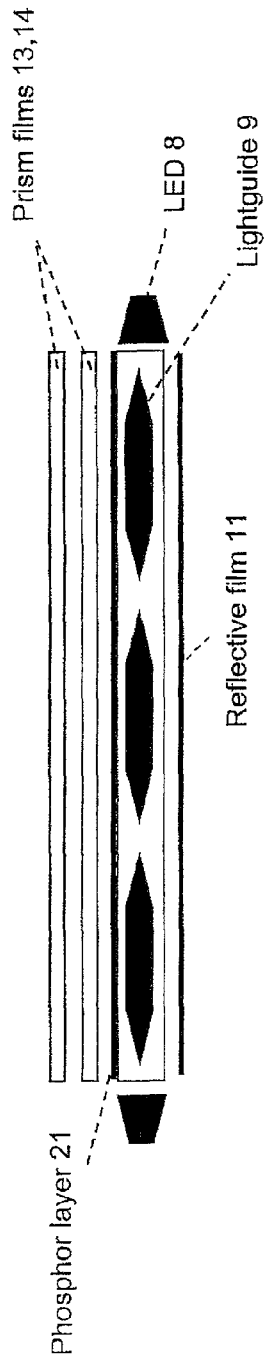
b). Top view
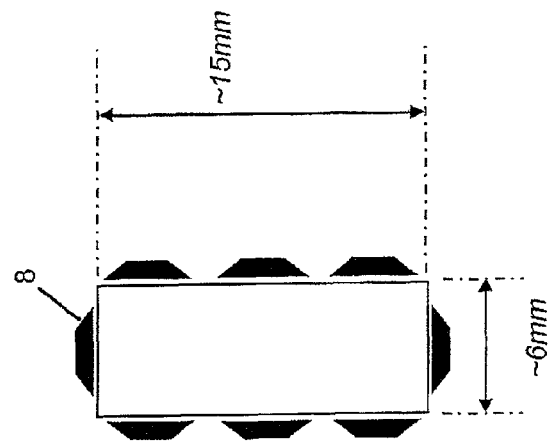

FIG. 15
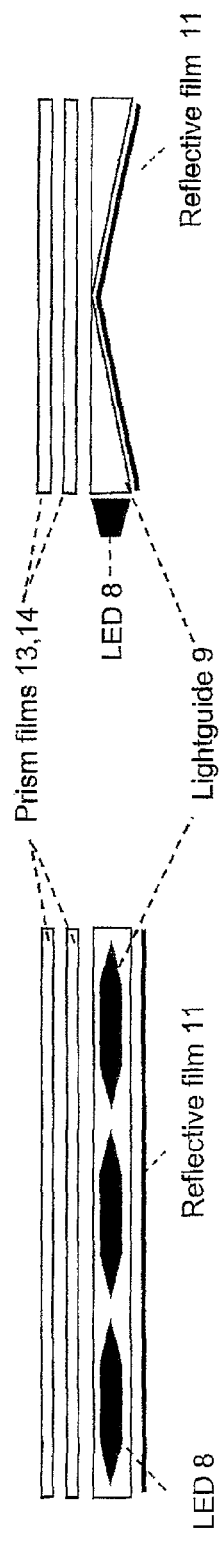
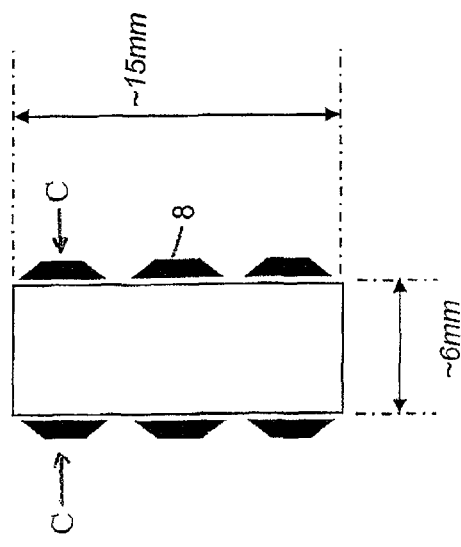

FIG. 16
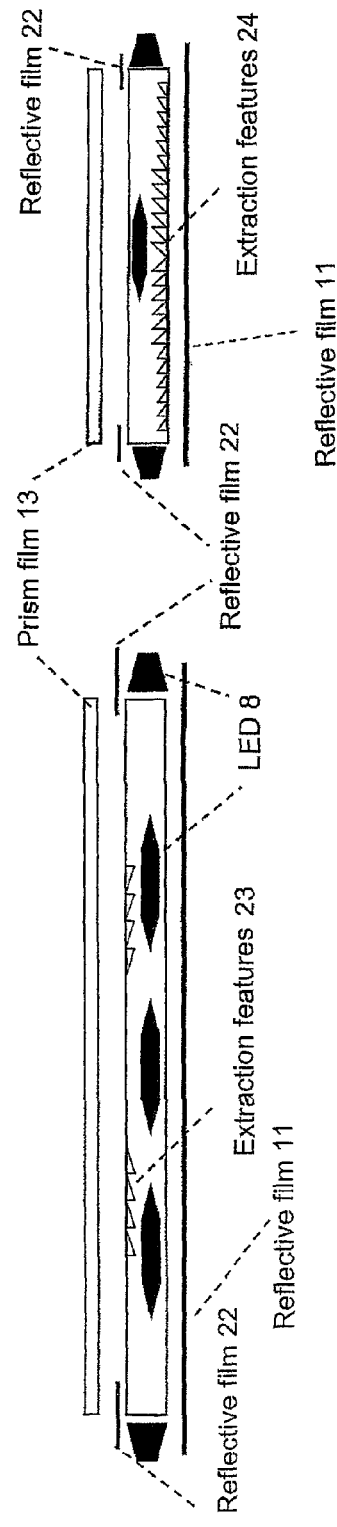
a). Cross section – side view
b). Cross section – end view
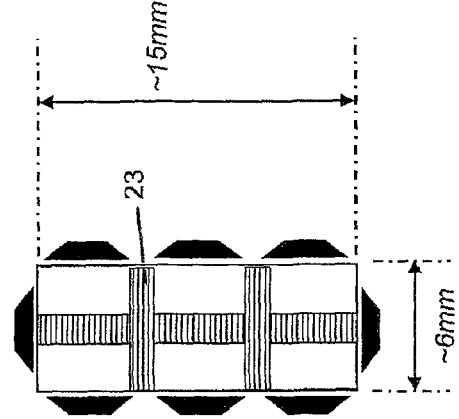
d). Top view
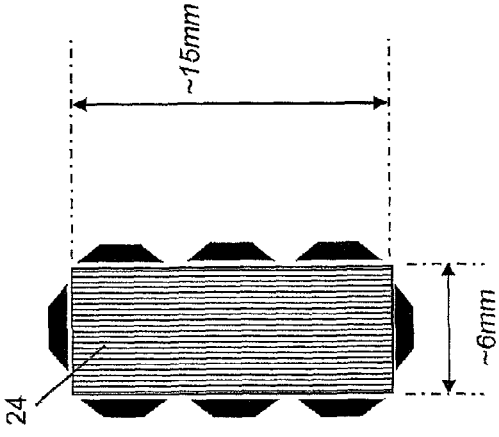
c). Bottom view F I G. 1 7
a). Cross section – side view
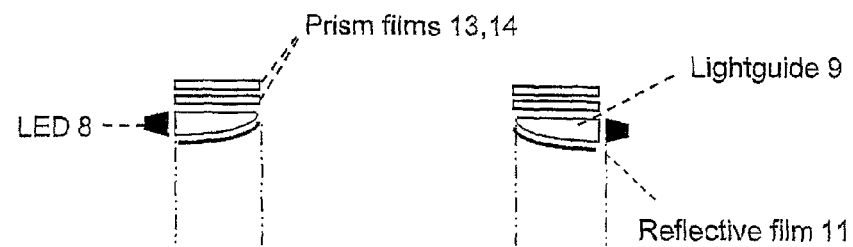
b). Top view
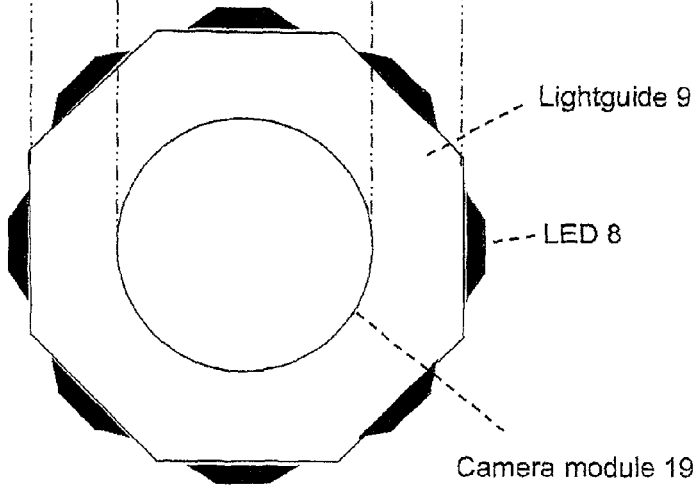

FIG. 18
a). Cross section – side view
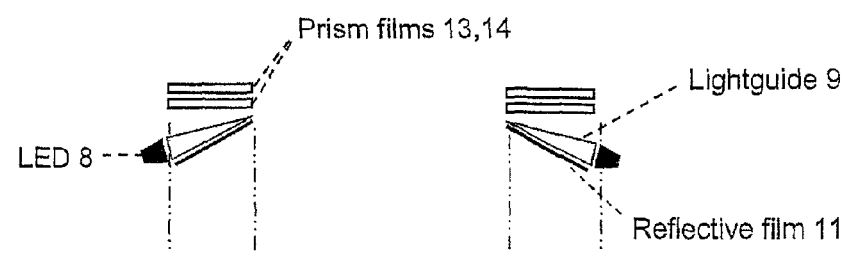
b). Top view
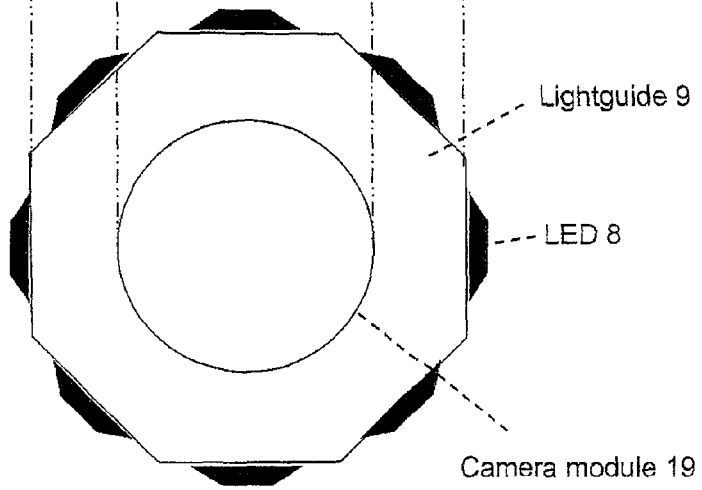

CAMERA FLASH, A CAMERA, AND A METHOD OF GENERATING A FLASH

This nonprovisional application claims priority under 35 U.S.C. §119(a) on Patent Application No. 0920734.1 filed in the United Kingdom on Nov. 26, 2009, the entire contents of which are hereby incorporated by reference.

FIELD OF THE INVENTION

This invention relates to camera flashes for flash photography, in particular to camera flashes on mobile devices. It also relates to a camera having a camera flash, and to a method of generating a flash for flash photography.

BACKGROUND OF THE INVENTION

Flash photography has been widely used for decades. It is a technique whereby a scene is illuminated by an intense pulse of light, generated by a camera flash, as the camera records the image. A few years ago the most popular type of camera flash was a xenon flash tube. These were fitted into most consumer cameras. With the advent of digital photography cameras have been made smaller, and this has created a strong demand for smaller flash units, especially on mobile camera phones. Recently advances in LED (light emitting diodes) technology have been made such that modern LEDs can produce pulses of light that are intense enough to be used as a camera flash, and in addition an LED camera flash has potential to be made smaller than a xenon flash tube.

A disadvantage of LEDs is that the pulse of light from an LED is emitted from a very small region. If viewed inappropriately, this light could be focused to a small and therefore intense spot on a person's retina. Therefore in the interest of safety the intensity of a directly viewed LED would have to be reduced. An example of a basic low intensity LED flash design is given by U.S. Pat. No. 7,136,672 (published 14 Nov. 2006).

The current state of the art in camera phone flashes use LEDs in conjunction with additional optical elements. In this flash the light from one or more LEDs 1 is spread out with various optical elements, for example a prism film 2 and a Fresnel lens 3, so that the light is emitted from a relatively large region of the phone. In this way the flash can be bright and safe. A sketch of the design is shown in FIG. 1.

This design is not ideal, as it is thick and some light is lost as it passes through the system.

A different type of flash is known in the field of professional photography. Camera flashes (which illuminate from a point) can produce unnatural images with strong shadows and specular reflections from skin which can makes faces look too shiny. Professional photographic studios would use very diffuse lighting. Some professional photographers use large 'ring flashes' which illuminate the subject from a wider range of angles to give a better picture. FIGS. 2(*a*) and 2(*b*) are a front view and a side view of a camera having a ring flash 4 attached to the camera body 5 such that the ring flash 4 is approximately concentric with the camera lens 6. An example of this type of flash is sold by the company Olympus (model number SRF-11 Ring Flash Set).

Most ring flashes are rings of xenon flash tube. An adapter for xenon flashes has been designed to attach to a regular xenon flash, and reflect the light around a ring so that it is emitted in a ring. This type of flash is called the 'Coco ring flash adapter' and is available from, for example, Microglobe Photo Equipments Limited, London, UK. These types of ring flash are large and not suitable for miniaturisation.

SUMMARY OF THE INVENTION

A first aspect of the invention provides a camera flash comprising: a light guide arranged to extract light at least through one surface; and one or more light sources arranged, in use, to emit light into the lightguide; wherein the or each light source is an LED or a laser diode; and wherein the flash is connectable in use to drive circuitry, the drive circuitry being for driving light source(s) to emit a pulse of light. The waveguide spreads out the light from the LED or laser diode light source(s), so that a pulse of light from the camera flash (ie, the "flash") does not present a safety risk. At the same time, however, less of the light from the light sources is lost than in the prior art of FIG. 1. The camera flash can thus provide a high overall optical output, but spread over an extended area (as defined by the waveguide) so as not to present a safety risk. Moreover, use of a waveguide to spread out the light from the LED or laser diode light source(s) means that the thickness of the camera flash may be significantly reduced compared to the thickness of a prior art camera flash.

A second aspect of the invention provides a camera comprising a camera flash as defined in the first aspect. In this aspect a camera flash of the invention is provided integrally within the camera at manufacture. The invention is not however limited to this and a camera flash of the invention may be used with (for example attached to) a pre-existing camera or in principle may even be used as a stand-alone flash unit for use with a separate camera.

A third aspect of the invention provides a method of generating a flash for flash photography, the method comprising driving the light source(s) of a camera flash to emit a pulse of light, the camera flash further comprising: a light guide arranged to extract light through one or more surfaces; and the light source(s) being arranged, in use, to emit light into the lightguide, wherein the or each light source is an LED or a laser diode. As is known, the camera flash is driven to emit the light at the same time that an associated camera is triggered to take a photograph such that the light from the camera flash illuminates the object(s) being photographed. The method for driving the light sources could include a pre-flash prior to the main flash to avoid red-eye artefacts. This pre-flash could be from a light source having a first spectral distribution or from a light source having a second spectral distribution.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIGS. 4(*a*) to 6(*b*) show alternative embodiments of the present invention using prism out-coupling features.
FIGS. 7(*a*) to 7(*d*) show examples of extended source flash designs made possible by the use of waveguide technology.
FIG. 8 shows a further embodiment of the present invention.
FIGS. 9(*a*) and 9(*b*) show an alternative embodiment of the flash whereby the waveguide is a fibre optic.

FIGS. 10(a) and 10(b) show another embodiment of the invention which uses white paint to extract light from the lightguide.

FIGS. 13(a) and 13(b) show an embodiment in which light is coupled into the lightguide through one of the major surfaces of the lightguide.

FIGS. 14(a) and 14(b) illustrate an alternative embodiment in which a phosphor layer serves to extract light from the lightguide.

FIGS. 15(a), 15(b) and 15(c) illustrate another embodiment whereby the lightguide is wedged in shape so that the waveguide becomes thinner as the light propagates into it.

FIGS. 16(a) to 16(d) show an embodiment in which the camera flash comprises an additional reflective film which is placed over the LED and makes a slight overlap with the lightguide.

FIGS. 17(a) and (b) illustrate an embodiment whereby the lightguide of the camera flash surrounds the camera module.

FIGS. 18(a) and 18(b) show an alternative embodiment in which the lightguide again surrounds the camera module.

DESCRIPTION OF THE EMBODIMENTS

Embodiment 1

Figure 1:
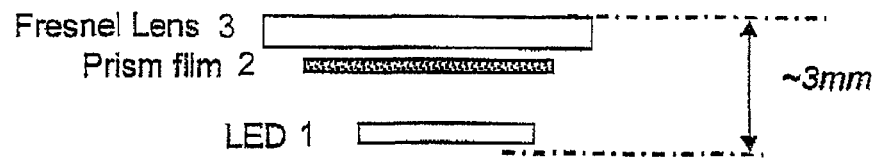
FIG. 1 shows a sketch of a prior art LED flash design.
Figure 2:
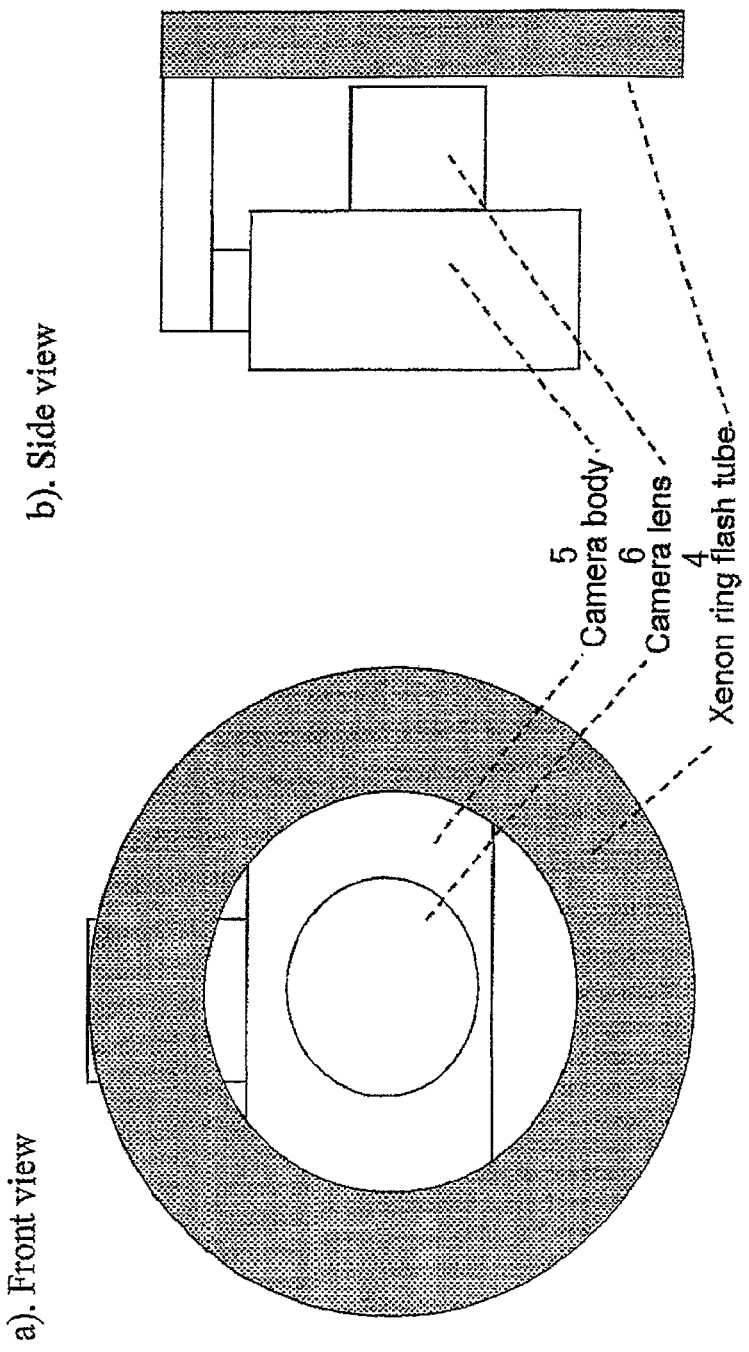
FIGS. 2(*a*) and 2(*b*) show a prior art ring flash design.

FIG. 3(a) is a sectional view of a camera flash 7 according to a first embodiment of the invention. Embodiment 1 describes the basic concept of the invention.

The camera flash 7 of FIG. 3(a) has one or more light sources 8, for example one or more LEDs, arranged to emit light into a lightguide (or waveguide) 9, preferably into an edge face of the lightguide 9. In this embodiment the lightguide is a planar lightguide having two opposed major surfaces and at least one minor surface. The lightguide is arranged to extract light at least through one major surface—in this embodiment one or preferably both major surfaces of the lightguide are provided with light extraction features 10 for extracting light that is propagating within the lightguide 9. The light extraction features are optionally configured as to extract light from the lightguide into a pre-defined angular range In the embodiment of FIG. 3(a) the upper major surface of the lightguide 9 (as the waveguide is oriented in FIG. 3(a)) is the desired output face. Preferably a reflective film 11, or other reflector, is placed behind the lightguide 9 so that any light extracted from the lightguide through its other major surface is not lost but is returned to the lightguide.

One or more optical elements, for example a diffuser 12, one or more prism films 13,14 and another diffuser 15 are optionally placed over the output face of the lightguide. The one or more optical elements are optionally arranged to, in use, direct light extracted from the lightguide into a pre-defined angular range.

The flash is connectable in use to drive circuitry, shown schematically as 25. The drive circuitry is for driving the light source(s) 8 to emit a pulse of light when this is desired, for example when it is desired to take a photograph.

To ensure that light is emitted from the lightguide 9 with a reasonably even intensity over the area of the output face, a plurality of light sources are preferably arranged around the lightguide as shown in FIG. 3(b). The distribution of light sources around the lightguide may be chosen so as to optimise the uniformity of light emitted from the lightguide. The light sources may be placed as close to the lightguide as possible to in-couple as much light from the sources into the lightguide or the light sources may be glued onto the lightguide itself. Gluing the light sources onto the lightguide may give increased luminance and uniformity from the flash. The camera flash is provided with, or is coupled to, suitable drive circuitry (not shown) that can drive the light source(s) 8 to emit a pulse of light so that the camera flash produces a "flash".

The lightguide 9 may have a uniform thickness. However, in any such design, the thickness of the waveguide may be wedged, or curved, in shape so that the waveguide becomes thinner as the light propagates into it. The extraction features 10 may be, for example, raised bumps, scattering regions, prism shapes, pyramid shapes, diffractive features etc. or a combination of each. Extraction features may be placed on both top and bottom of the waveguide (eg on both top and bottom major surfaces) to maximise the light extraction.

The angles of the prism film(s) 13,14 may be optimised to direct light in a range of angles about the on-axis direction, such that the angular extent of the light output from the camera flash is substantially equal to the angular extent of the field of view of a camera with which the flash is to be used.

The number density of the extraction features 10 (ie, the number of extraction features per unit area of the waveguide surface) may vary so as to be greater further away from the light sources so that there is more extraction further away from the light sources. This effect can be used to compensate for the decreasing light intensity that occurs in the waveguide at positions far from the light sources owing to the reduction in intensity that occurs with increase in distance from the light sources as light has already been extracted from the waveguide. There may also be an area around the periphery of the lightguide where there are no, or a limited number of, extraction features. This would have the advantage of creating a more uniform distribution of light across the lightguide surface and would also prevent 'bright spots' of light on the lightguide adjacent to the LEDs. In embodiments where light is extracted from two major surfaces of the lightguide, the area over which the extraction of light occurs from the lightguide may be different on the two major surfaces of the lightguide.

There may be in-coupling features (not shown) on the parts of the edge face of the waveguide that receive light from the light source(s) 8. Such features would help light from the LED(s) couple into the waveguide. In addition, there may be scattering features around the remaining edge face of the waveguide. These features would help to scatter light back into the waveguide and prevent it from directly exiting the waveguide edge.

Where a camera flash of the invention is applied to a mobile telephone, the camera flash 7 may be fitted within a bezel (not shown) in the mobile phone unit. The bezel may be designed to provide structural stability to the camera flash and also to enhance the optical performance. The bezel itself maybe made of any material. It may however be beneficial to make it from a scattering white plastic or to coat the plastic with a reflective layer of some kind. The bezel may then reflect any light which exits through the edge faces of the waveguide back into the waveguide thereby enhancing the optical performance.

A white LED (ie, an LED that emits white light) typically consists of a blue LED that illuminates a yellow phosphor. The overall output is a blue component (arising from light from the LED that is not absorbed) and a yellow component re-emitted by the phosphor, and the light from each component combines to create white light. It may be beneficial to use one or more blue LEDs as the light sources 8, and place the yellow phosphor within or on the surface of the waveguide or in one of the optical layers 12-15. This would help reduce the size of the camera flash since a blue only LED is smaller, and therefore a smaller waveguide could be used.

Alternatively, some or all of the light sources may consist of ultra-violet LEDs or infra-red LEDs. In this case the flash could be made to emit ultraviolet or infra red light. An example of where ultra violet illumination is useful is for the forensic examination of a crime scene. Infra-red illumination might be used to take a photograph discretely without the flash being noticeable to the human eye.

The light source(s) 8 may alternatively consist of one or more semiconductor laser diode(s).

A further advantage of a compact LED flash is that it can have a rapid repeat flash rate. Xenon flashes typically require a few seconds between flashes whilst a capacitor is charged. However, since a camera flash of the invention that uses one or more LEDs as the light sources can be driven directly from a battery the interval between successive flashes can be short and the repeat rate (eg the number of flashes per second) can be high. One example of where this could be useful is for taking video footage. The flash could be fired for a portion of each frame in the video. This could help to reduce motion blur, and may also be more efficient than running an LED light source continuously, since the camera sensor may not be active for the entire frame duration. Another example where this may be of use is for panoramic photography. It is possible to take panoramic photographs by panning the camera across a scene whilst the camera takes photographs at intervals. The photographs are then merged together to form a single panoramic shot. The movement of the camera could cause motion blur, however if a rapid flash pulse was used as each photograph was taken then this would reduce the motion blur since the scene would become brighter and a shorter exposure time could be used. The intervals at which photographs need to be taken could be determined using accelerometers, a certain time period, or by assessing the speed that the image is moving across the sensor.

Embodiment 2

In another embodiment of the invention the extraction from the waveguide could be done using prism features 10' as the light extraction features as shown in FIG. 4(*a*). These prisms might be positioned at right angles to the main light propagation direction within the waveguide, as shown in plan view in FIG. 4(*b*) or 4(*c*). A diffuser 12 might be provided on the front face of the waveguide to make the light emission from the face of the light guide more spatially uniform, or the angular output of light from the flash more uniform. The angles of the prism features may be optimised to direct light in a desired range of angles about the on-axis direction, and preferably to extract light mostly along the on-axis direction (or along another preferred direction). The use of prisms as the extraction features in this embodiment eliminates the need to provide separate prism films (as present in the embodiment of FIG. 3(*a*)).

Embodiment 3

FIG. 5(*a*) shows a camera flash according to a further embodiment of the invention. The camera flash of FIG. 5(*a*) corresponds generally to that of FIG. 4(*a*), with the light extraction features comprising prism features 10". The light extraction features prism shapes shown in FIG. 5(*a*) provide an alternative method for extracting light. The extracted light should be directed mostly on axis, especially if these prisms have a reflective coating (not shown) on their rear faces.

The prisms 10" may again be optionally positioned at right angles to the main light propagation direction within the waveguide, as shown in plan view in FIG. 5(*b*).

Embodiment 4

FIG. 6(*a*) shows a camera flash according to a further embodiment of the invention. The camera flash of FIG. 6(*a*) corresponds generally to that of FIG. 4(*a*), with the light extraction features comprising prism features 16. The prism features 16 shown in FIG. 6(*a*) provide an alternative method for extracting light.

In this embodiment, the prism features 16 are provided within the light guide, and have a lower refractive index than the body of the lightguide. The prism features 16 may conveniently be embodied as air gaps within the body of the lightguide, as this is straightforward to implement and provides a large difference between the refractive index of the lightguide and the refractive index of the prism features 16. The lightguide of FIG. 6(*a*) may be manufactured by laminating a prism sheet onto a planar lightguide, with the prisms of the prism sheet facing the lightguide.

The angles of the prism features 16 may again be chosen to direct light in a desired range of angles about the on-axis direction, or to extract light mostly along the on-axis direction. The prisms 16 may again be optionally positioned at right angles to the main light propagation direction within the waveguide, as shown in plan view in FIG. 6(*b*).

Embodiment 5

FIGS. 7(*a*) to 7(*d*) show examples of the shapes of waveguide flash that could be made. These figures show the camera flash mounted on or integral with the body of a mobile phone camera in which a camera module 19 having a lens (not shown) is provided on the mobile telephone for example, the lightguide of the camera flash may wholly or partially surround the camera module, with the lightguide being positioned in/on the body of the mobile telephone. (The body of the mobile telephone has been omitted from FIGS. 7(*a*) to 7(*d*) for clarity.) In a mobile telephone camera, the camera module is typically 5 mm across and the camera lens typically has a diameter of 3 mm, and in this application the lightguide of the camera flash may have dimensions (for example diameter in the case of a ring-shaped lightguide) of around 2 cm. The flash could be made to form the shape of a ring or annulus (or an approximation thereto) (FIGS. 7(*a*), 7(*b*)), a square (FIG. 7(*c*)), or any other desired shape such as a sun (FIG. 7(*d*)), or letters/numbers.

In the embodiments of FIGS. 7(*b*) to 7(*d*), the camera flash comprises one or more other lightguides.

In the embodiment of FIG. 7(*d*), the light sources (not shown) would be positioned to couple light into a plurality of, and preferably into each of, the light guides. There is preferably at least one separate light source for each lightguide 9. It may be desirable to illuminate only some of the lightguides of the design during the flash operation. The remaining lightguides may be present to add to the aesthetic appearance of the flash.

The invention is not however limited to use with a mobile telephone camera, and a camera flash of the invention may in principle be mounted on, or be integral with, the body of any camera. The size and shape of the lightguide may be chosen appropriately for each application.

Any of the extraction features mentioned previously could be used to extract light from the shaped waveguides of this embodiment.

In the embodiments described above the number density of the light extractions features provided on the lightguide may be substantially uniform over the lightguide or, as mentioned, it may increase with increasing distance from a light source. The invention is not limited to this, and the number density of light extraction features may be patterned over the area of the lightguide to produce a patterned spatial light distribution, for example, in the form of a symbol or text. The symbol or text would be visible when the camera flash is fired.

A camera flash of the invention might also be used for incoming call notification or other user notifications, such as for example notification of incoming text messages, where the camera flash is provided in or with a mobile telephone. In such an example, the lights source(s) of the camera flash would be arranged to emit light when an incoming call, or incoming SMS message (text message) etc, were received. A different colour of LED light might be used to denote these occurrences, for example by providing at least one second light source 8' (FIG. 8) that emits light of a second colour (ie, that emits light having a second spectral distribution different from the first spectral distribution of light emitted by the light source(s) 8) and that is arranged to emit light into the lightguide when an incoming call, or incoming text message etc, were received. (As noted above, the light source(s) 8 for use a camera flash will generally be white light sources so that the first spectral distribution is a white light spectral distribution, although the light source(s) 8 for use a camera flash may alternatively be ultraviolet or infra-red light sources). The second light source(s) 8' may be controlled by a control circuit 26 that causes the second light source(s) 8' to emit light when the control circuit 26 receives an indication that a predefined event, such as receipt of an incoming call or text message, has occurred. (The control circuit 26 may be separate from the drive circuit 25 of FIG. 3, or alternatively they may be combined as one circuit.)

In addition a camera flash of the invention may benefit from novel extraction features that turn the light around corners in the waveguide. These are explained more fully in Sharp's co-pending US published patent application US2010/0142223, the content of which is hereby incorporated by reference.

It may be beneficial to make the side edges of the waveguide reflective in regions that are not adjacent to a light source 8, to prevent emission of light through the side edges so that light is not lost in unwanted directions.

The above embodiments relate to a camera flash that uses a lightguide to spread out light from the light sources, so that the flash emits from a large area. In an alternative embodiment a camera flash may use as its light source an organic LED, whose emission area is shaped and takes the place of the waveguide of the above embodiments.

Embodiment 6

FIG. 9(a) shows a camera flash according to a further embodiment of the invention. In this embodiment a fibre optic cable 17 may form the basis of the flash waveguide. Light from one or more light sources 8 (for example an LED or laser diode) is introduced into and propagates along the fibre optic cable 17. This fibre may comprise extraction features (not shown) along its length to extract light from the fibre optic cable 17, and there may be focusing elements (not shown) which direct light extracted from the fibre optic cable in the desired direction. A reflector 18 is preferably disposed behind the fibre optic cable 17 as shown more clearly in FIG. 9(b), so that light emitted from the fibre optic cable 17 in undesired directions is reflected into the desired angular output range. The fibre optic cable 17 may be arranged into a desired shape. A camera flash of this embodiment may comprises two or more lengths of optical fibre cable, each receiving, in use, light from one or more associated light sources.

In a further embodiment, a lenticular lens (not shown) may be provided in order to focus light from the emitted from the fibre optic cable 17 in the direction of the field of view of a camera with which the camera flash is to be used.

A camera flash of the invention may be provided integrally with a camera. For example, a camera flash of the invention may be provided integrally with a mobile telephone that has a camera function. Alternatively a camera flash of the invention may be a "stand-alone" flash for use with a separate camera.

Embodiment 7

In another embodiment of the invention, shown in FIGS. 10(a) and 10(b), the number of light sources, for example the number of LEDs, and the shape of the lightguide are chosen to minimise the amount of light emitted, and therefore lost, through the edge faces of the lightguide.

In addition to losing less light through the edge faces, the embodiment of FIGS. 10(a) and 10(b) further has the LEDs 8 packed closely together as shown in FIG. 10(b) which should provide an improvement in the uniformity of the light distribution across the lightguide surface.

In this embodiment, extraction of light from the lightguide 9 is achieved by coating the lower major surface of the lightguide with a layer of diffuse white paint 20. The white paint could be, for example, a layer of Labsphere's 6080 white reflectance coating or other white reflective paint. The layer thickness could be optimised to make the layer 20 semi-opaque or even completely opaque. The use of an opaque layer of white paint eliminates the need to use a separate reflective film (as present in the embodiment of FIG. 3(a)). Prism films 13, 14 are placed over the output face of the lightguide. One, or both, of the prism films could optionally have a matt rear surface which would eliminate the need for a separate diffuser (also present in the embodiment of FIG. 3(a)).

FIG. 10(b) is a view of the camera flash from above, and shows the LEDs 8 and the uppermost of the prism films. Typical dimensions for the lightguide are shown in FIG. 10(b).

Embodiment 8

In another embodiment of the invention, shown in FIGS. 11(a) and 11(b), the lightguide is shaped to enhance the aesthetic appearance of the flash. The embodiment of FIGS. 11(a) and 11(b) illustrates a curved lightguide. The curvature of the lightguide is such that it allows a camera flash of this embodiment to be integrated smoothly into a shaped mobile phone unit (not shown).

In this embodiment, light is extracted from both major surfaces of the lightguide 9 using small scattering features, for example, a random array of tiny bumps provided on the major surfaces. These scattering features could be formed, for example, by powderblasting the major surfaces of the lightguide with a powder of Aluminium Oxide, embossing the major surfaces of the lightguide, etching the major surfaces of the lightguide, or by any alternative means.

A curved reflective film 11 is placed behind the lightguide 9 so that any light extracted from the lightguide through its other major surface is not lost but returned to the lightguide.

Figure 11:
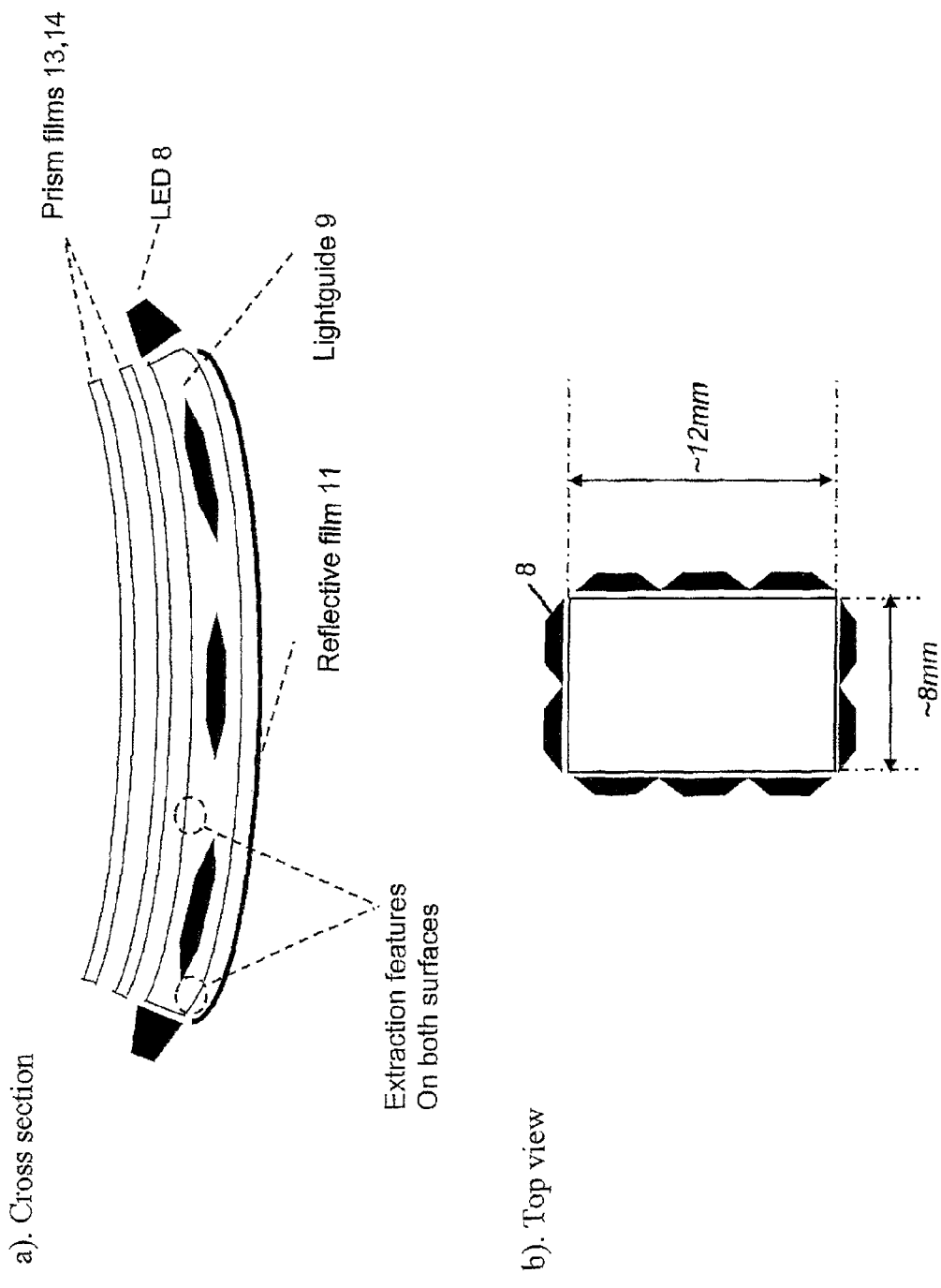
FIGS. 11(a) and 11(b) show an alternative embodiment in which the lightguide is curved into the plane of the page.

Prism films 13, 14 are placed over the output face of the lightguide (which is the upper major surface when the lightguide is oriented as shown in FIG. 11(*a*)). One, or both, of the prism films may be curved to allow the flash unit to fit together smoothly.

FIG. 11(*b*) is a view of the camera flash from above, and shows the LEDs 8 and the uppermost of the prism films. Typical dimensions for the lightguide are shown in FIG. 11(*b*).

Embodiment 9

Figure 12:
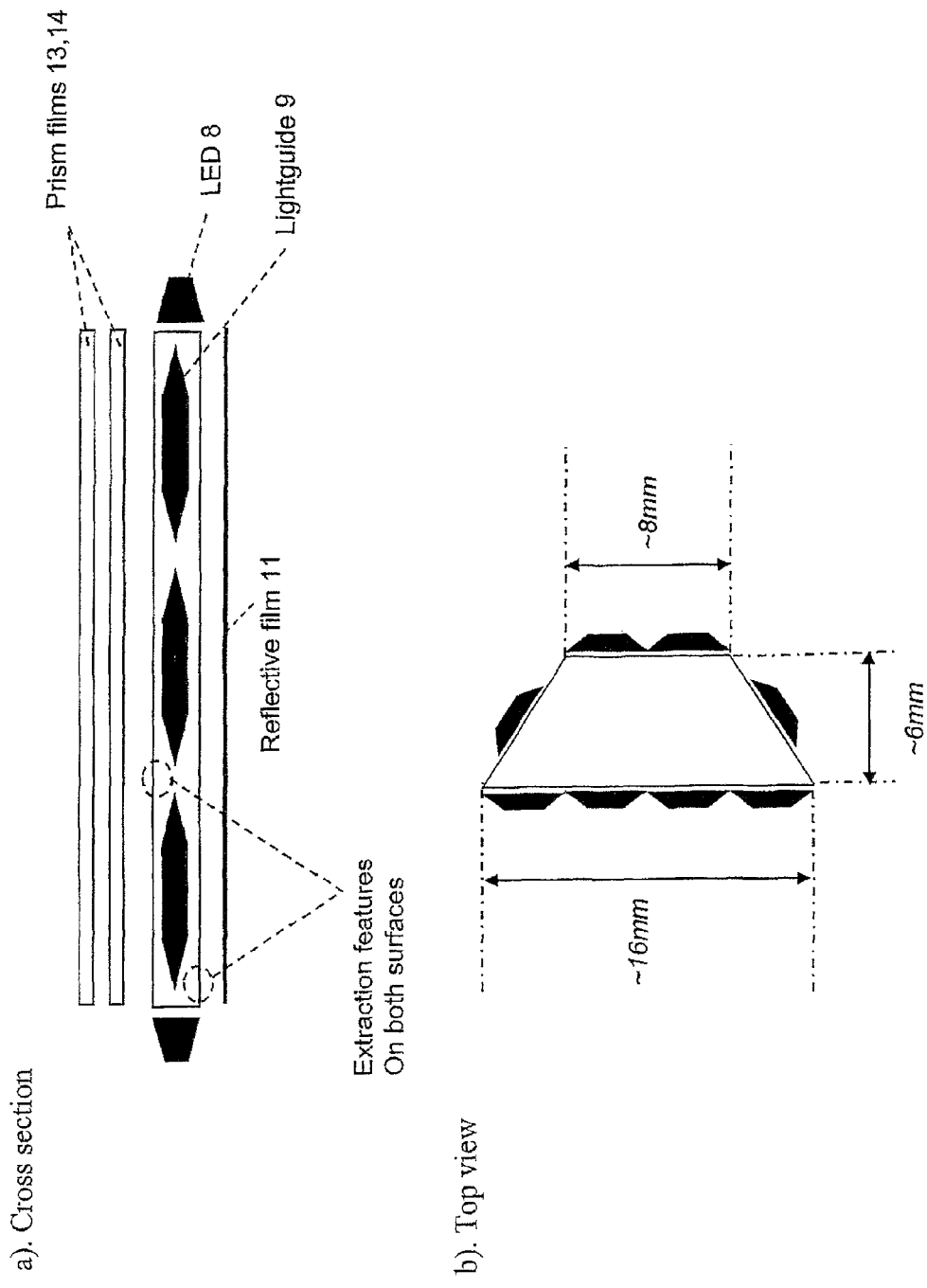
FIGS. 12(a) and 12(b) illustrates an embodiment in which a shaped lightguide is used.

In another embodiment of the invention, shown in FIGS. 12(*a*) and 12(*b*), the lightguide is shaped to enhance the aesthetic appearance of the camera flash (as seen in plan view). The lightguide could, for example, be made into the shape of the trademark or logo of a company. The embodiment of FIGS. 12(*a*) and 12(*b*) illustrates a trapezium shaped lightguide, but the invention is not limited to this. The number and position of LEDs may be chosen to optimise the luminance and uniformity of the camera flash.

In this embodiment, light is extracted from both major surfaces of the lightguide 9 using small microlenses, which could be formed using, for example, injection moulding, embossing or any alternative technique. However any suitable arrangement may be used to extract light from the lightguide 9 in this embodiment.

A reflective film 11 is placed behind the lightguide 9 so that any light extracted from the lightguide through its other major surface is not lost but returned to the lightguide.

Prism films 13, 14 are placed over the output face of the lightguide.

FIG. 12(*b*) is a view of the camera flash from above, and shows the LEDs 8 and the uppermost of the prism films. Typical dimensions for the lightguide are shown in FIG. 12(*b*).

Embodiment 10

In another embodiment of the invention, shown in FIGS. 13(*a*) and 13(*b*), the light sources 8, for example LEDs, are positioned to couple light into the lightguide through one of the major surfaces of the lightguide. The embodiment of FIG. 13(*a*) shows light being coupled into the lightguide 9 through its lower major surface. The upper major surface of the lightguide above the/an LED is shaped to re-direct the light entering the lightguide 9, forcing the major proportion of light to propagate along the lightguide. In the embodiment shown in FIG. 13(*a*), the upper major surface of the lightguide above an LED 8 is simply angled to re-direct the light along the lightguide. This shape could however be more complex, for example the upper major surface of the lightguide above an LED could be made curved, to re-direct a greater proportion of the incident light along the lightguide.

FIG. 13(*b*) is a view of the camera flash from above, and shows the uppermost of the prism films. (The LEDs 8 are not visible in FIG. 13(*b*), unlike in FIGS. 11(*b*) and 12(*b*), as can be understood from FIG. 13(*a*).) Typical dimensions for the lightguide are shown in FIG. 13(*b*).

In this embodiment, light is extracted from both major surfaces of the lightguide 9 using small microlenses, which could be formed using, for example, injection moulding, embossing or any alternative technique. However any suitable arrangement may be used to extract light from the lightguide 9 in this embodiment.

A reflective film 11 is placed behind the lightguide 9 so that any light extracted from the lightguide through its other major surface is not lost but returned to the lightguide.

Prism films 13, 14 are placed over the output face of the lightguide.

Embodiment 11

In another embodiment of the invention the light sources, for example LEDs, are positioned to couple light into the lightguide through the edge faces of the lightguide. The embodiment of FIGS. 14(*a*) and 14(*b*) shows light from blue LEDs being coupled into the lightguide. In this embodiment, the surface of the lightguide from which light is extracted (the upper major surface of the lightguide in FIG. 14(*a*)) is coated in a yellow phosphor layer 21. This phosphor layer serves to extract light from the lightguide and to create white light by combining the blue light from the LEDs with the yellow component re-emitted by the phosphor. A camera flash made using blue LEDs will have the advantage of being physically smaller as the LEDs themselves will be smaller. In addition, it maybe more efficient, cost effective and have a white colour with a better colour balance (white LEDs made using a yellow phosphor are often very blue looking).

A reflective film 11 is placed behind the lightguide 9 so that any light extracted from the lightguide through its other major surface is not lost but returned to the lightguide.

Prism films 13, 14 are placed over the output face of the lightguide.

FIG. 14(*b*) is a view of the camera flash from above, and shows the LEDs 8 and the uppermost of the prism films. Typical dimensions for the lightguide are shown in FIG. 14(*b*).

Embodiment 12

In another embodiment of the invention the lightguide is wedged, or curved, in shape so that the waveguide becomes thinner as the light propagates into it.

The embodiment of FIGS. 15(*a*)-15(*c*) shows a lightguide with a simple wedge shape, with the thicker end of the wedge closest to the LEDs.

In this embodiment, extraction of the light is achieved from the taper of the lightguide itself. As the light propagates along the lightguide taper, the angle of propagation is altered until the light can no longer totally internally reflect and is instead forced out of the lightguide. The tapered lightguide has the advantage of extracting most of the light from the lightguide and is therefore very efficient.

By carefully designing the angles of the wedge shaped lightguide, it should be possible to uniformly extract light from the lightguide. If further improvement to the uniformity is required, extraction features, for example, microlenses, could be provided on one or both major surfaces of the lightguide.

A reflective film 11 is placed behind the lightguide 9 so that any light extracted from the lightguide through its other major surface is not lost but returned to the lightguide. The reflective film is shaped to follow the shape of the other major surface of the lightguide as shown in FIG. 15.

Prism films 13, 14 are placed over the output face of the lightguide. One, or both, of the prism films may be angled to follow the shape of the major surface of the lightguide.

FIG. 15(*b*) is a view of the camera flash from above, and shows the LEDs 8 and the uppermost of the prism films. FIG. 15(*c*) is a cross-section through the camera flash along the line C-C in FIG. 15(*c*), and FIG. 15(*a*) is a cross-section through the camera flash along a line perpendicular to the line C-C in FIG. 15(*c*) Typical dimensions for the lightguide are shown in FIG. 15(*b*).

Embodiment 13

In another embodiment of the invention the camera flash comprises a reflective film 22 which is placed above the LED and makes a slight overlap with the upper major surface of the lightguide as illustrated in FIGS. 16(*a*) to 16(*d*). This reflective film, which could be a 3M Vikuiti (Trade Mark) Enhanced Specular Reflector (ESR) film or other reflective film, reflects light emitted through the upper casing of the LED back into the lightguide. This has the effect of increasing the efficiency of the light utilisation in the system.

In addition, this reflective film 22 relaxes the tolerance in position of the LED relative to the lightguide edge. Ideally, the LED should be placed in physical contact with the edge of the lightguide to in-couple as much of the light from the LED as possible. In practice however, the LED will be displaced from the edge of the lightguide by a small amount which is dependant upon the manufacturing tolerance. The greater this displacement, the greater is the amount of light emitted from the LED which misses being coupled into the edge face of the lightguide. The reflective film 22 has the effect of reflecting this missed light back towards the edge face of the lightguide thereby increasing the light coupled in and relaxing the tolerance in the positioning of the LED.

In this embodiment, light is extracted from both surfaces of the lightguide 9 using prism extraction features which could be formed using, for example, injection moulding, embossing or any alternative technique. The prisms are formed into the lightguide and have different properties on the upper and lower major surfaces of the lightguide. On the lower major surface of the lightguide, the prisms run parallel to the long edge of the lightguide and extend to cover the entire surface area. The prism properties change from the edge of the lightguide towards the centre. In this embodiment, the prism depth increases towards the centre of the lightguide. On the upper major surface of the lightguide the prisms run parallel to the short edge of the lightguide i.e. they are perpendicular to the prisms on the lower major surface of the lightguide. In this example, the prisms do not cover the entire surface area of the lightguide and are formed in an 'H' pattern.

The direction in which the prisms extend is not restricted to running parallel or perpendicular to the sides of the lightguide. To make the extraction of light from the lightguide more uniform it maybe beneficial for the prisms to run at an angle to the lightguide edge.

A reflective film 11 is placed behind the lightguide 9 so that any light extracted from the lightguide through its other major surface is not lost but returned to the lightguide.

Figure 3:
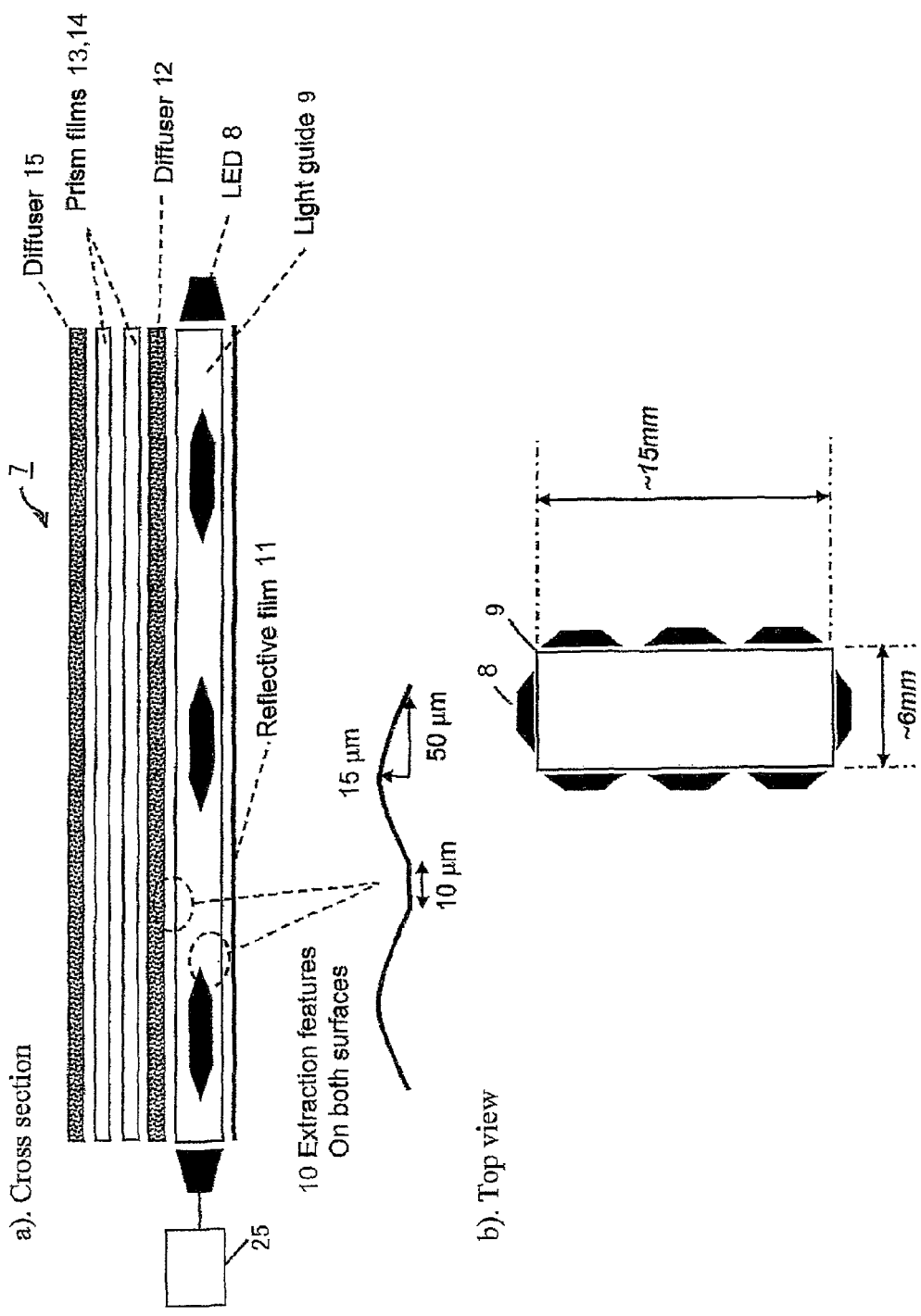
FIGS. 3(*a*) and 3(*b*) are cross-section and top views of a preferred embodiment of the present invention.

The use of prism extraction features in this embodiment eliminates the need for two prism films above the output face of the lightguide (present in the embodiment of FIG. 3(*a*)). In this embodiment only a single prism film 13 is placed over the output face of the lightguide. This has the advantage of decreasing cost and thickness.

FIG. 16(*c*) is a view of the camera flash from below, and shows the LEDs 8. The reflective film is omitted from FIG. 16(*c*), so that the region of the lightguide covered by the extraction features 24 can be shown (as indicated by shading, which also indicates the direction in which the prisms extend).

FIG. 16(*d*) is a view of the camera flash from above, and shows the LEDs 8. The prism film 13 is omitted from FIG. 16(*d*), so that the region of the lightguide covered by the extraction features 23 can be shown (as indicated by shading, which also indicates the direction in which the prisms extend; it will be seen that the extraction features 23 extend in a direction that is crossed with, and may be substantially perpendicular to, the direction in which the extraction features 24 extend).

Embodiment 14

In another embodiment of the invention the lightguide of the camera flash may wholly surround the camera module, with the lightguide being positioned in/on the body of the mobile telephone. The embodiment of FIGS. 17(*a*) and 17(*b*) shows a lightguide, surrounding the camera module, with the lightguide having a curved cross section so that the lightguide becomes thinner as the light propagates into it. As illustrated in the figure, the thicker end of the lightguide is adjacent to the LEDs. In this example, the camera module is approximately 9 mm in diameter and the lightguide of the camera flash may have dimensions of approximately 6 mm along the length of each side of the octagon shape. The light sources are positioned along each side of the octagon shape as illustrated.

In this embodiment, extraction of the light is achieved from the curve of the lightguide itself (in a similar manner to embodiment 12). By carefully designing the shape of the curve of the lightguide, it should be possible to uniformly extract light from the lightguide. If further improvement to the uniformity is required, extraction features, for example, micro-prisms, could be provided on one or both major surfaces of the lightguide.

A curved reflective film 11 is placed behind the lightguide 9 so that any light extracted from the lightguide through its other major surface is not lost but returned to the lightguide. The reflective film is shaped to follow the shape of the other major surface of the lightguide as shown in FIG. 17(*a*), which is a cross-section through the lightguide (the camera module is omitted from FIG. 17(*a*) for clarity). FIG. 17(*b*) is a view of the camera flash from above, and shows the LEDs 8 and the uppermost of the prism films; the camera module 19 is also indicated schematically in FIG. 17(*b*).

Prism films 13, 14 are placed over the output face of the lightguide. One, or both, of the prism films may be curved to follow the shape of the major surface of the lightguide.

Embodiment 15

FIGS. 18(*a*) and 18(*b*) show a camera flash according to a further embodiment of the invention. The camera flash of FIGS. 18(*a*) and (*b*) corresponds generally to that of FIGS. 17(*a*) and (*b*), with the lightguide of the camera flash wholly surrounding the camera body. FIG. 18(*a*) is a cross-section through the lightguide (the camera module is omitted from FIG. 18(*a*) for clarity). FIG. 18(*b*) is a view of the camera flash from above, and shows the LEDs 8 and the uppermost of the prism films; the camera module 19 is also indicated schematically in FIG. 18(*b*). As illustrated in FIG. 18(*a*), the lightguide has a wedged cross section so that the lightguide becomes thinner as the light propagates into it. Unlike FIG. 17(*a*), in this embodiment the major surface of the lightguide is at an angle to the plane of the mobile phone.

Extraction of the light from the lightguide is achieved from the taper of the lightguide itself (in a similar manner to embodiment 12). Careful design of the angle of the taper, together with additional extraction features if necessary, should ensure a uniform extraction of light from the lightguide.

A reflective film 11 is placed behind the lightguide 9 so that any light extracted from the lightguide through its other major surface is not lost but returned to the lightguide.

Prism films 13, 14 are placed over the output face of the lightguide. In this embodiment, the prism films are at an angle to the major surface of the lightguide. Orienting the lightguide and prisms in this way may have the benefit of improved efficiency.

The invention provides a method of creating a thin camera flash which is especially useful for mobile devices such as mobile phones that incorporate a camera (so-called "camera phones").

In the present invention the flash is created using an LED or laser diode light source. As is known, this light must be spread out so that the flash emits from a large area to enable the flash to be both bright and eye safe. This light spreading is done by coupling the LED light into a waveguide similar to that used in LCDs (liquid crystal displays). A preferred embodiment is shown in FIG. 3(*a*).

Light from the LED or laser diode is coupled into the waveguide. The light is guided along the waveguide by total internal reflection. The light would continue indefinitely along the waveguide if it was not for light extraction features provided in/on the waveguide. These light extraction features may for example be raised bumps in a surface of the waveguide, which bend the light such that it may exit the waveguide from the bump. The light then passes through diffusers and prism films which increase the amount of light that is emitted on axis. The prism films may be 3M Vikuiti (Trade Mark) BEF sheets orientated so that the prisms are at right angles to each other. The reflective film at the back of the flash ensures that all light is directed out of the top surface of the flash. The reflective film could be a 3M Vikuiti (Trade Mark) Enhanced Specular Reflector (ESR) film or other reflective film. The reflective film could be replaced by a solar cell.

This construction of flash may be very thin. For example, white LEDs exist that have an emission region less than 600 micrometers thick, and this light may be coupled into a waveguide of similar thickness. The additional films are thin enough so that the total thickness of the LED flash system is less than 1 millimeter. The emission area of the flash may be varied according to the designer preference, for example a flash emission area on a mobile phone might be approximately 6 mm by 14 mm.

Methods of spreading out light are known from the field of liquid crystal displays (LCDs). An LCD is typically illuminated by a cold cathode fluorescent lamp (CCFL). The light from the CCFL must spread out so that it illuminates the display uniformly from behind. This is typically done using a method as described in the paper 'Highly efficient backlight for liquid crystal display having no optical films', Okumura et al, Applied Physics Letters, vol 83, no. 13, 29 Sep. 2003, p 2515. Light from the CCFL is directed into a waveguide, and the light is guided along the waveguide until it is out-coupled by scattering dots on the waveguide.

Korean patent application 5022260A (published 28 Dec. 2005) uses a fibre optic bundle to transmit light from a flash to two point sources for a stereoscopic camera. The flash which comes from two point sources provided two distinct shadows which can be used in the analysis of the scene in order to understand what distances objects are away from the camera.

Nowhere in the prior art is there disclosure of an LED camera flash that spreads LED light into an extended source using a thin optical system similar to an LCD waveguide.

One advantage of camera flash of the invention is that it can be much thinner than previous designs. Previous LED mobile telephone flash units have used optical elements such as diffusers and Fresnel lenses to spread the light from the LED. A typical example of this type of design is 3 mm in thickness. The new invention makes possible a camera flash that can be less than 1 mm thick.

In addition, use of a waveguide may allow light to be emitted more uniformly from the emission area. This is important because uniformly emitted light is easier on the eye.

Furthermore, use of a waveguide to manipulate LED light may be more efficient (that is, result in less light lost) than the optical components used in the prior art.

The waveguide may be any shape, for example the flash emission area could be made into the shape of a cartoon sun, a ring, letters, or any other shape. If the shape of the flash was a ring that surrounded the camera lens (or an approximation thereto, for example a plurality of linear segments that approximate a circle) a 'ring flash' would be created. As described above, ring flashes are known in the field of professional photography. Light from a flash which is almost a point source will create strong shadows in the photograph, whereas light from a ring flash prevents harsh shadows from being formed.

The lightguide may be a planar or substantially planar lightguide having two opposed major surfaces and at least one minor surface, the lightguide being arranged to extract light at least through one major surface. Such lightguides are known, for example, for use in backlights for an LCD display.

Light extraction features for extracting light from the waveguide may be arranged in or on at least one major surface of the lightguide, or they may be arranged within the lightguide.

The light extraction features may be so configured as to extract light from the lightguide into a pre-defined angular range. For example, where a camera flash of the invention is intended for use with a specific camera it is preferable for the angular range of the light output from the camera flash to be substantially the same as the field of view of the camera. Alternatively, they may be so configured as to extract light from the lightguide substantially on-axis (or substantially along another preferred direction). This would mean that the centre of the field of view would receive more illumination from the camera flash than would the periphery.

In circumstances where it is known that the centre of the field of view will receive more illumination from the camera flash than the periphery then software could be used to adjust the image for this drop in luminance towards the periphery.

The light extraction features may be prisms. They may be shaped so as to extract light from the lightguide into a pre-defined angular range, or to extract light from the lightguide primarily along a preferred direction (such as the on-axis direction). They may extend generally perpendicular to a direction of propagation of light within the lightguide.

Alternatively, the light extraction features may be microlenses or scattering bumps.

A phosphor layer may cover the lightguide surface.

The camera flash may comprise one or more optical elements provided over the one major surface of the lightguide. At least one of the one or more optical elements may be arranged to, in use, direct light extracted from the lightguide into a pre-defined angular range.

The camera flash may comprise a reflector disposed behind the other major surface of the light guide. This recycles light that is emitted from the other major surface of the lightguide, thereby improving the output efficiency of the camera flash.

The camera flash may be mounted such that the user can re-direct the light emitted from the flash. The user could, for example, choose to directly illuminate the subject. Alternatively the user could choose to direct the flash towards the ceiling thereby illuminating the subject more diffusely and reducing the formation of harsh shadows in the photograph taken.

The light guide may comprise an optical fibre.

The camera flash may comprise a reflector disposed around part of the circumference of the optical fibre.

The camera flash may comprise one or more other lightguide, the or each other light guide having at least one associated light source arranged to emit light into the other lightguide.

The camera may be a mobile telephone camera.

The camera may comprise a drive circuit for driving the light source(s) to emit a pulse of light. The light sources may be wired in series, parallel, or a combination of both.

The camera may further comprising at least one second light source arranged to emit light into the lightguide, and a control circuit for causing the second light source to emit light upon receipt of an indication that a predefined event has occurred. This provides a simple way of alerting the user that the predefined event has occurred.

The one or more light sources are arranged to cause the camera flash to emit light having a first spectral distribution and the second light source may be arranged to cause the camera flash to emit light having a second spectral distribution different from the first spectral distribution.

The first spectral distribution may be a white light spectral distribution. By a "white light spectral distribution" is meant a spectral distribution that is perceived as white light by an observer.

The predetermined event may be receipt of an SMS message or receipt of an incoming call.

The angular range of light emitted by the camera flash may be substantially equal to the field of view of the camera.

The lightguides(s) may substantially define an annulus or an approximation thereto, the annulus being centred on an axis passing through substantially the centre of the lens of the camera. By an "approximation to an annulus" is meant, for example, a plurality of linear lightguides arranged so as to approximate the shape of a circle (for example as shown in FIG. 7(c) below) and/or to substantially enclose a desired region.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

The invention claimed is:

1. A camera flash for a camera, the camera flash comprising: a lightguide arranged to extract light at least through one surface; one or more light sources arranged, in use, to emit light into the lightguide, and three or more optical films;
   wherein the or each light source is an LED or a laser diode;
   wherein the flash is connectable in use to drive circuitry, the drive circuitry being for driving the light source(s) to emit a pulse of light,
   wherein the lightguide is a planar lightguide having two opposed major surfaces and at least one minor surface, the lightguide being arranged to extract light at least through one major surface,
   wherein each of the three or more optical films is provided over a major surface of the lightguide,
   wherein light extraction features for extracting light from the lightguide are arranged on at least one major surface of the lightguide, wherein the number density of the extraction features vary so as to be greater further away from the light sources so that there is more extraction further away from the light sources, and
   wherein an angular range of light emitted by the camera flash is substantially equal to a field of view of the camera.

2. A camera flash as claimed in claim 1, wherein light extraction features for extracting light from the lightguide are arranged within the lightguide.

3. A camera flash as claimed in claim 1 wherein the light extraction features are so configured as to extract light from the lightguide into a pre-defined angular range.

4. A camera flash as claimed in claim 1 wherein the light extraction features are prisms.

5. A camera flash as claimed in claim 4 wherein the prisms extend generally perpendicular to a direction of propagation of light within the lightguide.

6. A camera flash as claimed in claim 1 wherein the light extraction features are selected from the group consisting of microlenses and scattering bumps.

7. A camera flash as claimed in claim 1 wherein a phosphor layer covers the lightguide surface.

8. A camera flash as claimed in claim 1 wherein at least one of the three or more optical films is arranged to, in use, direct light extracted from the lightguide into a pre-defined angular range.

9. A camera flash as claimed in claim 1 wherein at least one of the three or more optical films is a reflector disposed behind the other major surface of the lightguide.

10. A camera flash as claimed in claim 1 wherein the lightguide comprises an optical fibre.

11. A camera flash as claimed in claim 10 and comprising a reflector disposed around part of the circumference of the optical fibre.

12. A camera flash as claimed in claim 1 and comprising one or more other lightguide, the or each other lightguide having at least one associated light source arranged to emit light into the other lightguide.

13. A camera comprising a camera flash as defined in claim 1.

14. A camera as claimed in claim 13 wherein the camera is a mobile telephone camera.

15. A camera as claimed in claim 13 and comprising a drive circuit for driving, in use, the light source(s) to emit a pulse of light.

16. A camera as claimed in claim 13 and further comprising at least one second light source arranged to emit light into the lightguide, and a control circuit for causing the at least one second light source to emit light upon receipt of an indication that a predefined event has occurred.

17. A camera as claimed in claim 16, wherein the one or more light sources are arranged to cause the camera flash to emit light having a first spectral distribution and wherein the second light source is arranged to cause the camera flash to emit light having a second spectral distribution different from the first spectral distribution.

18. A camera flash as claimed in claim 17 wherein the first spectral distribution is a white light spectral distribution.

19. A camera as claimed in claim 17 wherein the predetermined event is receipt of an SMS message or receipt of an incoming call.

20. A camera as claimed in claim 13 wherein the angular range of light emitted by the camera flash is substantially equal to the field of view of the camera.

21. A camera as claimed in claim 13 wherein the lightguides(s) substantially define an annulus or an approximation thereto, the annulus being centred on an axis passing through substantially the centre of the lens of the camera.

22. A method of generating a flash for flash photography, the method comprising driving light source(s) of a camera flash of a camera to emit a pulse of light, the camera flash further comprising: a lightguide arranged to extract light through one surface, the light source(s) being arranged, in use, to emit light into the lightguide; and three or more optical films;

wherein the or each light source is an LED or a laser diode, wherein the lightguide is a planar lightguide having two opposed major surfaces and at least one minor surface, the lightguide being arranged to extract light at least through one major surface, wherein each of the three or more optical films is provided over a major surface of the lightguide, and wherein light extraction features for extracting light from the lightguide are arranged on at least one major surface of the lightguide, wherein the number density of the extraction features vary so as to be greater further away from the light sources so that there is more extraction further away from the light sources wherein an angular range of light emitted by the camera flash is substantially equal to a field of view of the camera.

* * * * *